United States Patent
Ohori et al.

(10) Patent No.: US 11,098,667 B2
(45) Date of Patent: Aug. 24, 2021

(54) VEHICLE

(71) Applicant: TOYOTA JIDOSHA KABUSHIKI KAISHA, Toyota (JP)

(72) Inventors: Shinya Ohori, Toyota (JP); Naoya Okubo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/889,941

(22) Filed: Jun. 2, 2020

(65) Prior Publication Data
US 2021/0033037 A1 Feb. 4, 2021

(30) Foreign Application Priority Data
Aug. 1, 2019 (JP) .............................. JP2019-142191

(51) Int. Cl.
*F02D 41/06* (2006.01)
*F02D 41/14* (2006.01)
*F02D 41/38* (2006.01)

(52) U.S. Cl.
CPC ....... *F02D 41/068* (2013.01); *F02D 41/1486* (2013.01); *F02D 41/3845* (2013.01); *F02D 41/144* (2013.01)

(58) Field of Classification Search
CPC ............... F02D 41/068; F02D 41/1486; F02D 41/3845; F02D 41/144
See application file for complete search history.

(56) References Cited

U.S. PATENT DOCUMENTS

| 2009/0112444 | A1* | 4/2009 | Ishizuka | F02D 41/0085 701/105 |
| 2010/0101536 | A1* | 4/2010 | Nakata | F02D 41/042 123/457 |
| 2018/0163661 | A1 | 6/2018 | Ohori et al. | |
| 2018/0347491 | A1* | 12/2018 | Rousseau | F02D 41/068 |

FOREIGN PATENT DOCUMENTS

| JP | 2015-40493 A | 3/2015 |
| JP | 2015-132171 A | 7/2015 |
| JP | 2018-96278 A | 6/2018 |

* cited by examiner

*Primary Examiner* — Joseph J Dallo
(74) *Attorney, Agent, or Firm* — Oblon, McClelland, Maier & Neustadt, L.L.P.

(57) ABSTRACT

During operation of the engine for a time period from a system-on operation to a system-off operation, the vehicle causes the warming-up determination parameter to be subject to addition when an engine is not in a flow path heat release state where an amount of heat released in the supply flow path is expected to be larger than an amount of heat received in the supply flow path, while causing the warming-up determination parameter to be subject to subtraction when the engine is in the flow path heat release state and a duration time of the flow path heat release state is equal to or longer than a first predetermined time period.

8 Claims, 6 Drawing Sheets

VEHICLE

CROSS-REFERENCE TO RELATED APPLICATIONS

The present disclosure claims priority to Japanese Patent Application No. 2019-142191 filed Aug. 1, 2019, which is incorporated herein by reference in its entirety including specification, drawings and claims.

TECHNICAL FIELD

The present disclosure relates to a vehicle.

BACKGROUND

A proposed configuration of a vehicle includes an engine having a cylinder injection valve; a fuel supply device having a high pressure fuel pump configured to pressurize a fuel from a fuel tank and supply the pressurized fuel to a supply flow path which is connected with the cylinder injection valve; and a fuel pressure sensor configured to detect the pressure of the fuel in the supply flow path (as described in, for example, JP 2018-96278A). This vehicle performs characteristic abnormality diagnosis to determine whether a characteristic abnormality occurs in the fuel pressure sensor when abnormality diagnosis preconditions are satisfied after duration of a system-off state for a set time period that is set in advance since a system-off operation. The abnormality diagnosis preconditions include a condition that a warming-up determination parameter indicating the degree of warming-up in the supply flow path in the system-off state is equal to or larger than a predetermined value. For a time period from a system-on operation to a system-off operation, the warming-up determination parameter is subject to addition when the engine is in operation, while being subject to subtraction after satisfaction of a predetermined condition when the engine is at stop.

SUMMARY

The vehicle of the above configuration causes the warming-up determination parameter to be subject to addition when the engine is in operation. In the case of a high speed cruise drive of the vehicle with low load operation of the engine, however, the temperature of the supply flow path is likely to decrease. There is accordingly a possibility that the warming-up determination parameter does not sufficiently reflect the temperature of the supply flow path (i.e., the degree of warming-up).

A main object of a vehicle of the present disclosure is to cause a warming-up determination parameter to more appropriately reflect the temperature of a supply flow path (i.e., the degree of warming-up).

In order to achieve the above primary object, the vehicle of the present disclosure employs the following configuration.

The present disclosure is directed to a vehicle. A vehicle includes an engine having a cylinder injection valve configured to inject a fuel into a cylinder, a fuel supply device having a high pressure fuel pump configured to pressurize the fuel from a fuel tank and supply the pressurized fuel to a supply flow path which is connected with the cylinder injection valve, a fuel pressure sensor configured to detect a pressure of the fuel in the supply flow path and a control device configured to control the engine and the fuel supply device and to perform characteristic abnormality diagnosis that determines whether a characteristic abnormality occurs in the fuel pressure sensor, when an abnormality diagnosis precondition is satisfied after duration of a system-off state for a set time period that is set in advance since a system-off operation, wherein the abnormality diagnosis precondition includes a condition that a warming-up determination parameter indicating a degree of warming-up in the supply flow path in the system-off state is equal to or larger than a predetermined value. During operation of the engine for a time period from a system-on operation to a system-off operation, the control device causes the warming-up determination parameter to be subject to addition when the engine is not in a flow path heat release state where an amount of heat released in the supply flow path is expected to be larger than an amount of heat received in the supply flow path, while causing the warming-up determination parameter to be subject to subtraction when the engine is in the flow path heat release state and a duration time of the flow path heat release state is equal to or longer than a first predetermined time period.

The vehicle according to this aspect of the present disclosure performs the characteristic abnormality diagnosis that determines whether the characteristic abnormality occurs in the fuel pressure sensor when the abnormality diagnosis precondition is satisfied after duration of the system-off state for the set time period that is set in advance since the system-off operation. The abnormality diagnosis precondition includes the condition that the warming-up determination parameter indicating the degree of warming-up in the supply flow path in the system-off state is equal to or larger than the predetermined value. During operation of the engine for the time period from the system-on operation to the system-off operation, the vehicle causes the warming-up determination parameter to be subject to addition when the engine is not in the flow path heat release state where the amount of heat released in the supply flow path is expected to be larger than the amount of heat received in the supply flow path, while causing the warming-up determination parameter to be subject to subtraction when the engine is in the flow path heat release state and the duration time of the flow path heat release state is equal to or longer than the first predetermined time period. Accordingly, the warming-up determination parameter is subject to subtraction when the duration time of the flow path heat release state is equal to or longer than the first predetermined time period during operation of the engine. This configuration enables the warming-up determination parameter to more appropriately reflect the temperature of the supply flow path (i.e., the degree of warming-up). As a result, this configuration enables the characteristic abnormality diagnosis of the fuel pressure sensor to be more appropriately performed. The "duration time of the flow path heat release state is equal to or longer than the first predetermined time period", for example, in the case of a high speed cruise drive with low load operation of the engine.

Figure 6:
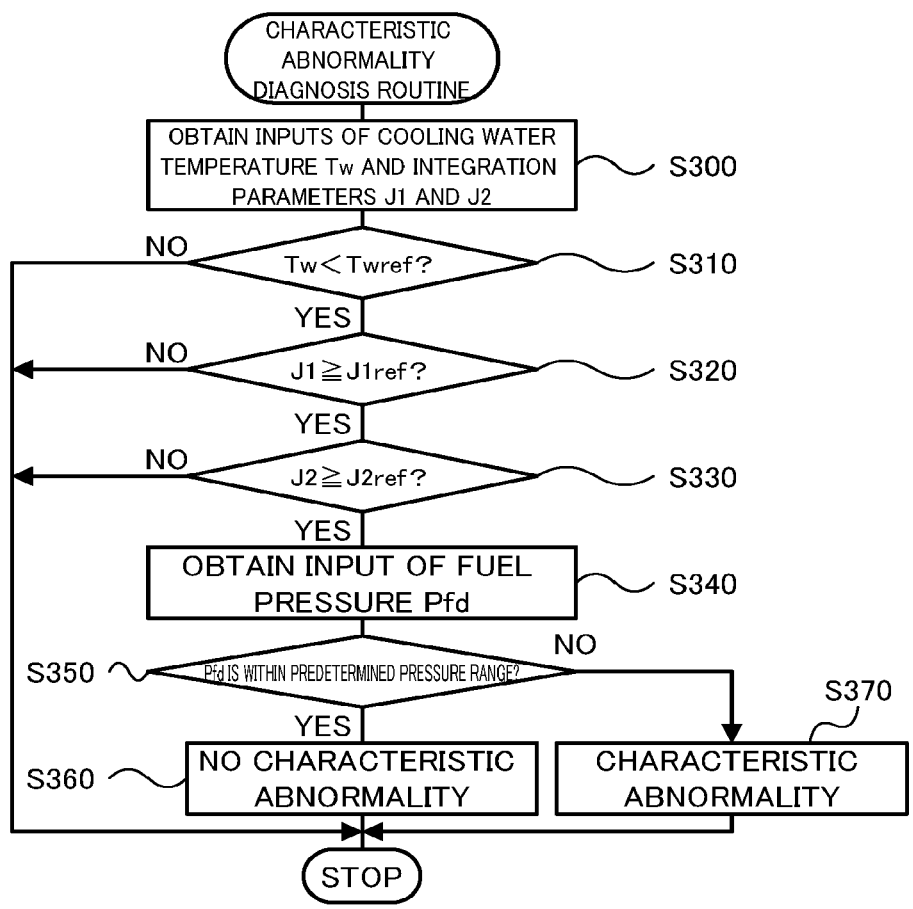
Figure 7:
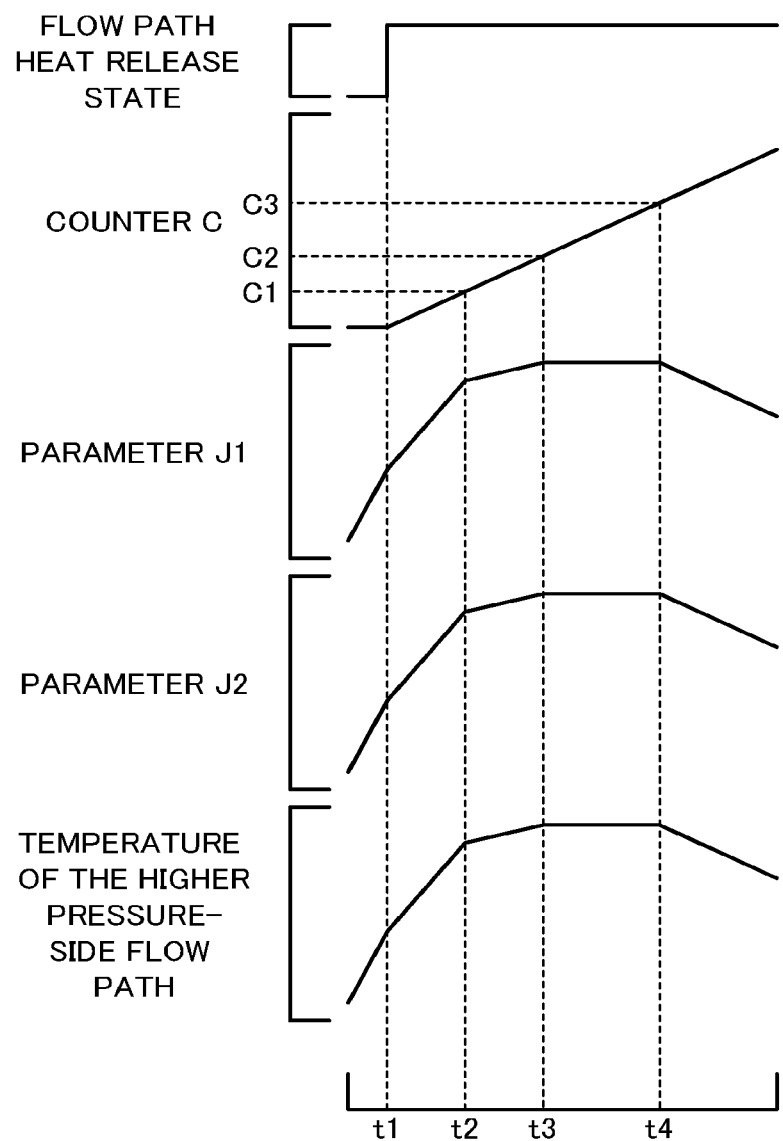

FIG. 6 is a flowchart showing one example of a characteristic abnormality diagnosis routine performed by the HVECU after elapse of the predetermined time period since an OFF operation of the ignition switch; and FIG. 7 is a diagram illustrating one example of time changes in the state of the engine, the counter, the air amount integration parameter, the operating time integration parameter and the temperature of the higher pressure-side flow path.

The following describes some aspects of the disclosure with reference to embodiments.

Figure 1:
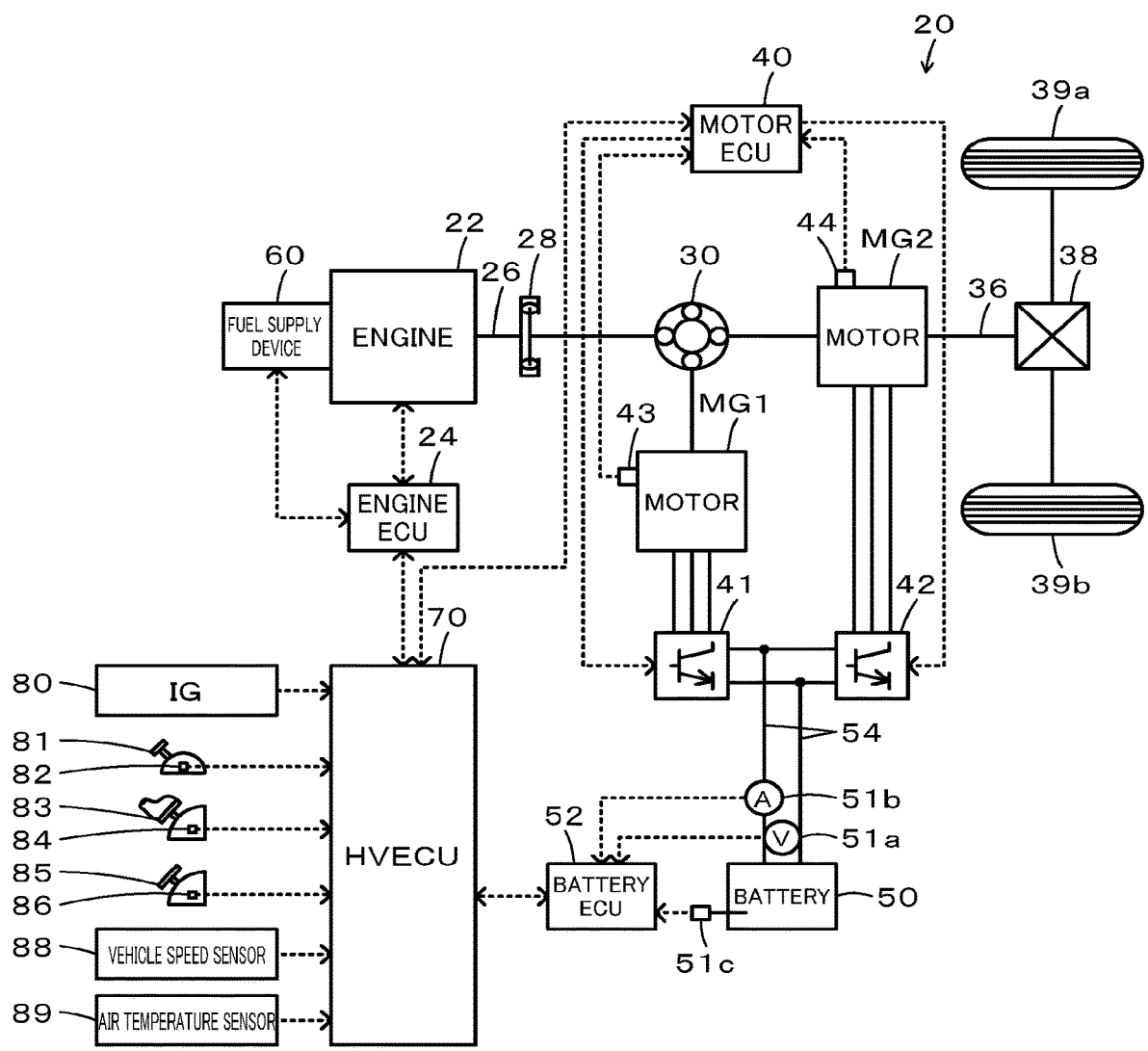
FIG. 1 is a configuration diagram illustrating the schematic configuration of a hybrid vehicle according to one embodiment of the present disclosure.
Figure 2:
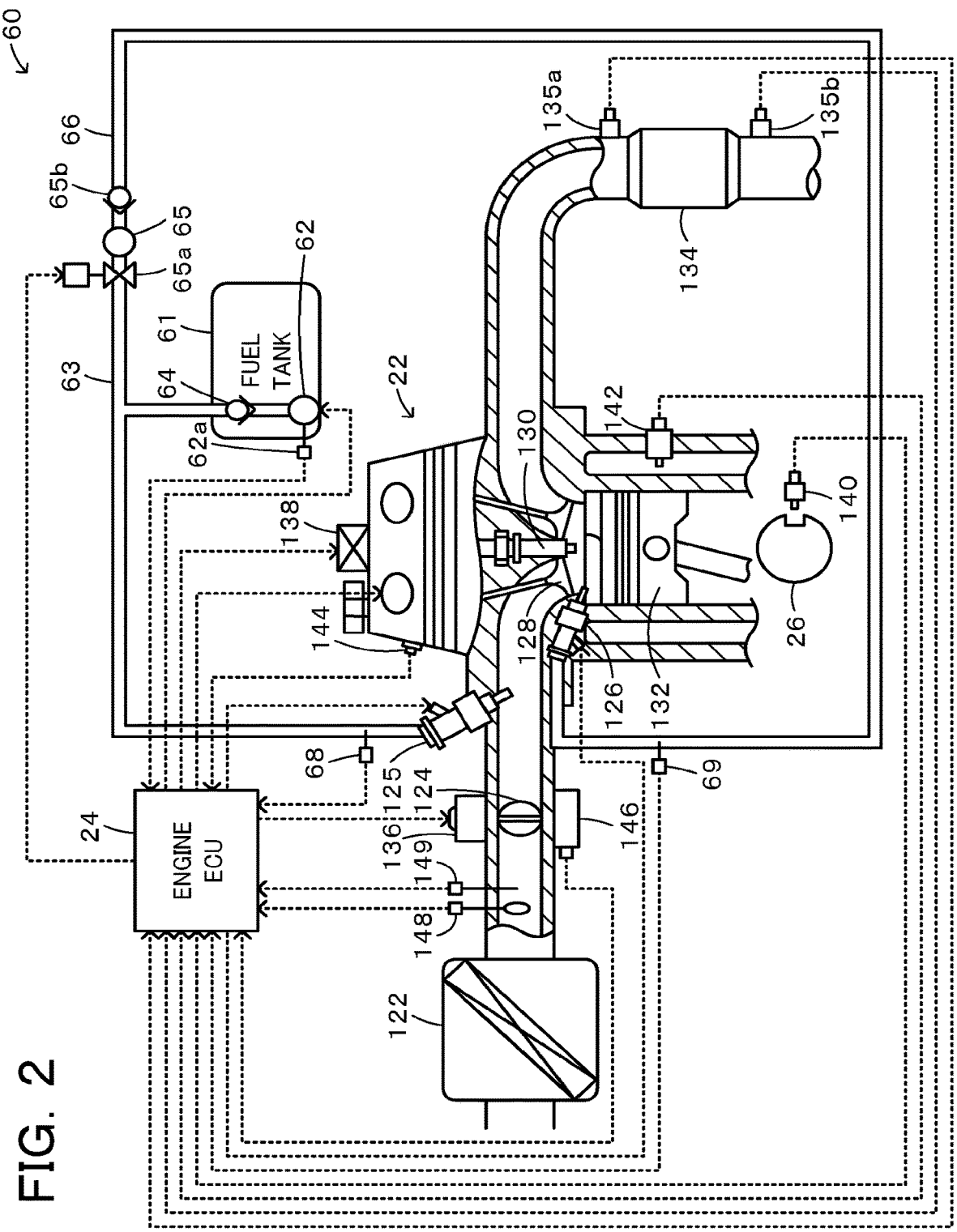
FIG. 2 is a configuration diagram illustrating the schematic configuration of an engine and a fuel supply device.

FIG. 1 is a configuration diagram illustrating the schematic configuration of a hybrid vehicle 20 according to one embodiment of the present disclosure. FIG. 2 is a configuration diagram illustrating the schematic configuration of an engine 22 and a fuel supply device 60. As shown in FIG. 1, the hybrid vehicle 20 of the embodiment includes the engine 22, the fuel supply device 60, a planetary gear 30, motors MG1 and MG2, inverters 41 and 42, a battery 50 and a hybrid electronic control unit (hereinafter referred to as "HVECU") 70.

The engine 22 is configured as an internal combustion engine that outputs power using a fuel, such as gasoline or light oil. As shown in FIG. 2, the engine 22 includes a port injection valve 125 configured to inject the fuel into an intake port and a cylinder injection valve 126 configured to inject the fuel into a cylinder. The engine 22 is provided with both the port injection valve 125 and the cylinder injection valve 126 and is accordingly operable in any one of a port injection mode, a cylinder injection mode and a shared injection mode. In the port injection mode, the air cleaned by an air cleaner 122 and taken in via a throttle valve 124 is mixed with the fuel injected from the fuel injection valve 125. This air-fuel mixture is taken into a combustion chamber via an intake valve 128 and is explosively combusted with an electric spark generated by a spark plug 130. The reciprocating motion of a piston 132 that is pressed down by the energy of the explosive combustion is converted into rotating motion of a crankshaft 26. In the cylinder injection mode, the air is taken into the combustion chamber in a similar manner to that in the port injection mode, while the fuel is injected from the cylinder injection valve 126 in the middle of an intake stroke or in a compression stroke. The air-fuel mixture is then explosively combusted with an electric spark generated by the spark plug 130, so as to provide the rotating motion of the crankshaft 26. In the shared injection mode, the fuel is injected from the port injection valve 125 while the air is taken into the combustion chamber. The fuel is also injected from the cylinder injection valve 126 in the intake stroke or in the compression stroke. The air-fuel mixture is then explosively combusted with an electric spark generated by the spark plug 130, so as to provide the rotating motion of the crankshaft 26. The injection mode is switched over among these injection modes, based on the operating conditions of the engine 22. The exhaust emission discharged from the combustion chamber passes through an exhaust emission control device 134 filled with an emission control catalyst (three-way catalyst) serving to convert toxic components such as carbon monoxide (CO), hydrocarbons (HC) and nitrogen oxides (NOx) into less toxic components and is then released to the outside air.

As shown in FIG. 2, the fuel supply device 60 is configured as a device to supply the fuel to the port injection valve 125 and the cylinder injection valve 126 of the engine 22. The fuel supply device 60 includes a fuel tank 61, a feed pump (first pump) 62 configured to supply the fuel from the fuel tank 61 to a lower pressure-side flow path (first flow path) 63 that is connected with the port injection valve 125, a check valve 64 provided in the lower pressure-side flow path 63, and a high pressure fuel pump (second pump) 65 configured to pressurize the fuel on the port injection valve 125-side of the check valve 64 in the lower pressure-side flow path 63 and supply the pressurized fuel to a higher pressure-side flow path (second flow path) 66 that is connected with the cylinder injection valve 126.

The feed pump 62 and the check valve 64 are placed in the fuel tank 61. The feed pump 62 is configured as an electric pump that is operated with a supply of electric power from the battery 50. The check valve 64 is opened when the fuel pressure (pressure of the fuel) on the feed pump 62-side in the lower pressure-side flow path 63 is higher than the fuel pressure on the port injection valve 125-side, while being closed when the fuel pressure on the feed pump 62-side is equal to or lower than the fuel pressure on the port injection valve 125-side.

The high pressure fuel pump 65 is a pump driven by the power from the engine 22 (rotation of a cam shaft) to pressurize the fuel in the lower pressure-side flow path 63. The high pressure fuel pump 65 includes an electromagnetic valve 65a that is connected with an intake port thereof and that is opened and closed in the process of pressurizing the fuel, and a check valve 65b that is connected with an exhaust port thereof and that serves to prevent the reverse flow of the fuel and to maintain the fuel pressure in the higher pressure-side flow path 66. When the electromagnetic valve 65a is opened during operation of the engine 22, this high pressure fuel pump 65 serves to take in the fuel from the feed pump 62. When the electromagnetic valve 65a is closed, the high pressure fuel pump 65 serves to intermittently feed the fuel compressed by a plunger (not shown) which is operated by the power from the engine 22, to the higher pressure-side flow path 66 via the check valve 65b and thereby pressurize the fuel that is to be supplied to the higher pressure-side flow path 66. While the high pressure fuel pump 65 is driven, the fuel pressure in the lower pressure-side flow path 63 and the fuel pressure in the higher pressure-side flow path 66 are pulsated according to the rotation of the engine 22 (i.e., the rotation of the cam shaft).

The engine 22 and the fuel supply device 60 are operated and controlled by an engine electronic control unit (hereinafter referred to as "engine ECU") 24. The engine ECU 24 is configured as a CPU-based microprocessor and includes a ROM configured to store processing programs, a RAM configured to temporarily store data, input/output ports and a communication port, in addition to the CPU, although not being illustrated.

Signals from various sensors required for operation and control of the engine 22 and for control of the fuel supply device 60 are input into the engine ECU 24 via the input port. The signals input into the engine ECU 24 include, for example, a crank position θcr from a crank position sensor 140 configured to detect the rotational position of the crankshaft 26 and a cooling water temperature Tw from a water temperature sensor 142 configured to detect the temperature of cooling water of the engine 22. The input signals also include a cam position θca from a cam position sensor 144 configured to detect the rotational position of an intake cam shaft that is provided to open and close the intake valve 128 and to detect the rotational position of an exhaust cam shaft that is provided to open and close an exhaust valve. The input signals further include a throttle position TH from a throttle valve position sensor 146 configured to detect the position of the throttle valve 124, an intake air flow Qa from an air flowmeter 148 mounted to an intake pipe, and an intake air temperature Ta from a temperature sensor 149 mounted to the intake pipe. The input signals additionally include an air-fuel ratio AF from an air-fuel ratio sensor 135a mounted to an exhaust pipe and and an oxygen signal O2 from an oxygen sensor 135b mounted to the exhaust pipe. The input signals also include a rotation speed Nfp of the feed pump 62 from a rotation speed sensor 62a mounted to the feed pump 62 of the fuel supply device 60, a fuel pressure Pfp of the fuel that is to be supplied to the port injection valve 125, from a fuel pressure sensor 68 mounted to the vicinity of the port injection valve 125 in the lower pressure-side flow path 63, and a fuel pressure Pfd of the fuel that is to be supplied to the cylinder injection valve 126, from a fuel pressure sensor 69 mounted to the vicinity of the cylinder injection valve 126 in the higher pressure-side flow path 66.

Various control signals for operation and control of the engine 22 and for control of the fuel supply device 60 are output from the engine ECU 24 via the output port. The signals output from the engine ECU 24 include, for example, a driving signal to the port injection valve 125, a driving signal to the cylinder injection valve 126, a driving signal to a throttle motor 136 provided to regulate the position of the throttle valve 124, and a control signal to an ignition coil 138 integrated with an igniter. The output signals also include a drive control signal to the feed pump 62 and a drive control signal to the electromagnetic valve 65a of the high pressure fuel pump 65.

The engine ECU 24 is connected with the HVECU 70 via respective communication ports. The engine ECU 24 calculates a rotation speed Ne of the engine 22, based on the crank angle θcr input from the crank position sensor 140. The engine ECU 24 also calculates a volumetric efficiency (a ratio of the volume of the intake air actually taken in one cycle to a cylinder capacity per cycle of the engine 22) KL, based on the intake air flow Qa input from the air flowmeter 148 and the calculated rotation speed Ne of the engine 22.

As shown in FIG. 1, the planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 is configured, for example, as a synchronous generator motor and has the rotor that is connected with the sun gear of the planetary gear 30 as described above. The motor MG2 is configured, for example, as a synchronous generator motor and has a rotor that is connected with the driveshaft 36. The inverters 41 and 42 are connected with the motors MG1 and MG2 and are also connected with the battery 50 via power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2 and a temperature tm2 of the motor MG2 from a temperature sensor configured to detect the temperature of the motor MG2, are input into the motor ECU 40 via the input port. The motor ECU 40 outputs via the output port, for example, switching control signals to the plurality of switching elements (not shown) included in the respective inverters 41 and 42. The motor ECU 40 is connected with the HVECU 70 via the respective communication ports. The motor ECU 40 calculates rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the inverters 41 and 42 via the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50. The battery ECU 52 is connected with the HVECU 70 via the respective communication ports. The battery ECU 52 calculates a state of charge SOC, based on an integrated value of the battery current Ib input from the current sensor 51b. The state of charge SOC denotes a ratio of the amount of electric power dischargeable from the battery 50 to the total capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88, and an outside air temperature Tout from an outside air temperature sensor 89. The HVECU 70 is connected with the engine ECU 24, the motor ECU 40 and the battery ECU 52 via the respective communication ports as described above.

The hybrid vehicle 20 of the embodiment having the above configuration sets a required driving force that is required for the driveshaft 36, based on the accelerator position Acc and the vehicle speed V and operates and controls the engine 22 and the motors MG1 and MG2, such that a required power corresponding to the required driving force is output to the driveshaft 36. There are three modes (1) to (3) given below as operation modes of the engine 22 and the motors MG1 and MG2:

(1) torque conversion operation mode: This mode operates and controls the engine 22, such that a power corresponding to the required power is output from the engine 22, and also drives and controls the motors MG1 and MG2, such that all the power output from the engine 22 is subjected to torque conversion by the planetary gear 30 and the motors MG1 and MG2 and that the required power is output to the driveshaft 36.

(2) charge discharge operation mode: This mode operates and controls the engine 22, such that a power corresponding to the sum of the required power and a power required for charging or discharging the battery 50 is output from the engine 22, and also drives and controls the motors MG1 and MG2, such that all or part of the power output from the engine 22 is subjected to torque conversion by the planetary gear 30 and the motors MG1 and MG2, accompanied with charging or discharging of the battery 50, and that the required power is output to the driveshaft 36.

(3) motor operation mode: This mode stops the operation of the engine 22 and drives and controls the motor MG2, such that the required power is output to the driveshaft 36.

In the hybrid vehicle 20 of the embodiment, the engine ECU 24 performs intake air flow control, fuel injection control and control of the feed pump 62 and the high pressure feed pump 65 of the fuel supply device 60 in the process of operating the engine 22.

A procedure of the intake air flow control first sets a target air flow Qa*, based on a target torque Te* of the engine 22. The procedure subsequently sets a target throttle position TH*, such that the intake air flow Qa becomes equal to the target air flow Qa*. The procedure then controls the throttle motor 136, such that the throttle position TH becomes equal to the target throttle position TH*.

A procedure of the fuel injection control first sets an executing injection mode among the port injection mode, the cylinder injection mode and the shared injection mode, based on the rotation speed Ne and the volumetric efficiency KL of the engine 22. The procedure subsequently sets a target injection amount Qfp* of the port injection valve 125 and a target injection amount Qfd* of the cylinder injection valve 126, based on the set target air flow Qa* and the set executing injection mode, such that the air fuel ratio AF becomes equal to a target air fuel ratio AF* (for example, stoichiometric ratio). The procedure then sets a target injection time τfp* of the port injection valve 125 and a target injection time τfd* of the cylinder injection valve 126, based on the target injection amounts Qfp* and Qfd* and the fuel pressures Pfp and Pfd. After setting the target injection times τfp* and τfd*, the procedure controls the port injection valve 125 and the cylinder injection valve 126, such that fuel injections for the respective fuel injection times τfp* and τfd* are performed from the port injection valve 125 and from the cylinder injection valve 126.

A procedure of controlling the feed pump 62 first sets a target discharge amount Qpp* of the feed pump 62, based on a target fuel pressure Pfp* of the fuel that is to be supplied to the port injection valve 125 and a total target injection amount Qfsum that is a sum of the target injection amount Qfp* of the port injection valve 125 and the target injection amount Qfd* of the cylinder injection valve 126. According to the embodiment, the target fuel pressure Pfp* is set to a relatively high predetermined fuel pressure Pfp1 at the start of operation of the engine 22 and is changed over to a predetermined fuel pressure Pfp2 that is lower than the predetermined fuel pressure Pfp1 after elapse of a predetermined time T1. The predetermined fuel pressure Pfp1 used is, for example, about 500 kPa to 550 kPa. The predetermined fuel pressure Pfp2 used is, for example, about 380 kPa to 420 kPa. The predetermined time T1 used is, for example, about 5 seconds to 7 seconds. According to the embodiment, the target discharge amount Qpp* is set to increase with an increase in the target fuel pressure Pfp* and to increase with an increase in the total target injection amount Qfsum. After setting the target discharge amount Qpp*, the procedure controls the feed pump 62, such that a discharge amount (amount of fuel) from the feed pump 62 becomes equal to the target discharge amount Qpp*.

A procedure of controlling the high pressure fuel pump 65 first sets a target discharge amount Qpd* of the high pressure fuel pump 65, based on a target fuel pressure Pfd* of the fuel that is to be supplied to the cylinder injection valve 126 and the target injection amount Qfd* of the cylinder injection valve 126. The target fuel pressure Pfd* used is, for example, several MPa to ten-odd MPa. According to the embodiment, the target discharge amount Qpd* is set to increase with an increase in the target fuel pressure Pfd* and to increase with an increase in the target injection amount Qfd. After setting the target discharge amount Qpd*, the procedure controls the electromagnetic valve 65a of the high pressure fuel pump 65, such that a discharge amount (amount of fuel) from the high pressure fuel pump 65 becomes equal to the target discharge amount Qpd*.

Figure 3:
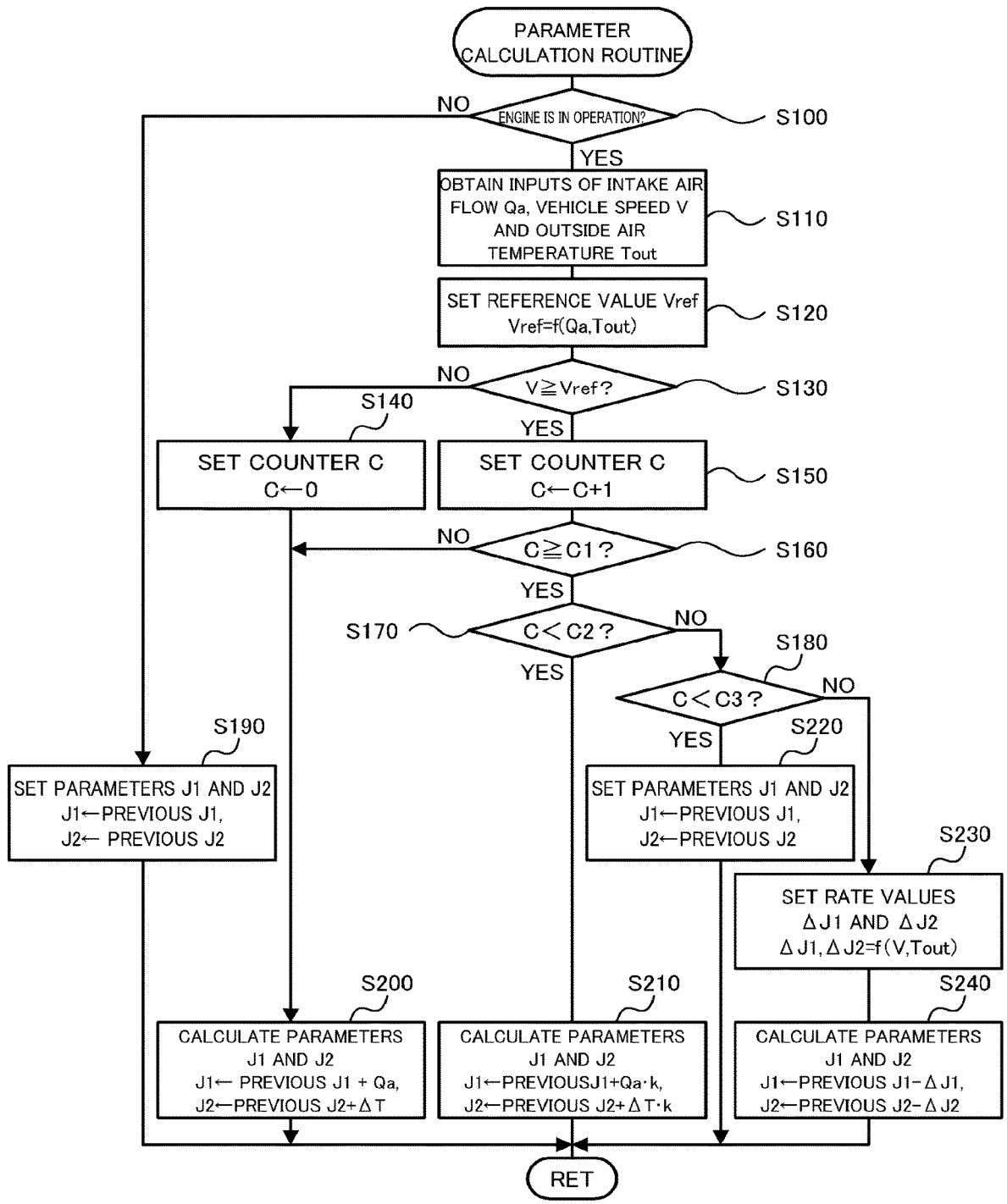
FIG. 3 is a flowchart showing one example of a parameter calculation routine performed by the HVECU according to the embodiment.

The following describes operations of the hybrid vehicle 20 of the embodiment having the configuration described above or more specifically a series of operations to calculate warming-up determination parameters that indicate the degree of warming-up in the higher pressure-side flow path 66 and that are used to determine whether preconditions for performing characteristic abnormality diagnosis of the fuel pressure sensor 69 mounted in the vicinity of the cylinder injection valve 126 in the higher pressure-side flow path 66, are satisfied. FIG. 3 is a flowchart showing one example of a parameter calculation routine performed by the HVECU 70 according to the embodiment. This routine is performed repeatedly at every predetermined time interval (for example, at every several tens mscc) for a time period from an ON operation to an OFF operation of the ignition switch 80. According to the embodiment, the warming-up determination parameters used are an air amount integration parameter J1 with regard to integration of the intake air flow Qa of the engine 22 and an operating time integration parameter J2 with regard to integration of the operating time of the engine 22. The air amount integration parameter J1 and the operating time integration parameter J2 are reset to a value 0 as initial values when the ignition switch 80 is turned ON.

When the parameter calculation routine of FIG. 3 is triggered, the HVECU 70 first determines whether the engine 22 is in operation or at stop (step S100). When it is determined that the engine 22 is at stop, the HVECU 70 sets previous settings of the integration parameters (previous J1) and (previous J2) to the air amount integration parameter J1 and the operating time integration parameter J2, i.e., keeps the air amount integration parameter J1 and the operating time integration parameter J2 unchanged (step S190) and then terminates the parameter calculation routine.

When it is determined at step S100 that the engine 22 is in operation, the HVECU 70 obtains the inputs of data such as the intake air flow Qa of the engine 22, the vehicle speed V and the outside air temperature Tout (step S110). The intake air flow Qa of the engine 22 input here is a value detected by the air flowmeter 148 and received from the engine ECU 24 by communication. The vehicle speed V input here is a value detected by the vehicle speed sensor 88. The outside air temperature Tout input here is a value detected by the outside air temperature sensor 89.

Figure 4:
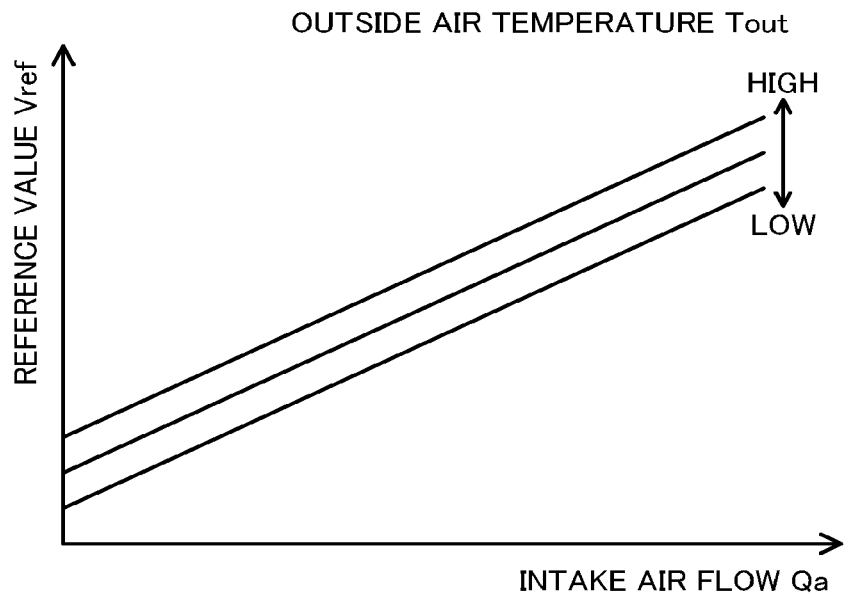
FIG. 4 is a diagram illustrating one example of the reference value setting map.

After obtaining the input data, the HVECU 70 sets a reference value Vref, based on the input intake air flow Qa of the engine 22 and the input outside air temperature Tout (step S120) and compares the input vehicle speed V with the reference value Vref (step S130). The reference value Vref denotes a threshold value used to determine whether the engine 22 is in a flow path heat release state where the amount of heat released is expected to be larger than the amount of heat received in the higher pressure-side flow path 66. According to the embodiment, a procedure of setting the reference value Vref specifies in advance relationships of the intake air flow Qa of the engine 22 and the outside air temperature Tout to the reference value Vref and stores the specified relationships as a reference value setting map into the ROM (not shown). When values of the intake air flow Qa of the engine 22 and the outside air temperature Tout are given, the procedure reads out the reference value Vref corresponding to the given values of the intake air flow Qa and the outside air temperature Tout from this map and sets the reference value Vref. FIG. 4 is a diagram illustrating one example of the reference value setting map. As illustrated, the reference value Vref is set to increase with an increase in the intake air flow Qa of the engine 22 and to decrease with a decrease in the outside air temperature Tout. Such settings are based on the facts that the higher vehicle speed V generates the stronger driving wind and causes the larger amount of heat to be released from the higher pressure-side flow path 66, that the higher intake air flow Qa of the engine 22 causes the larger amount of heat to be generated by the engine 22 and causes the larger amount of heat to be received by the higher pressure-side flow path 66, and that the lower outside air temperature Tout causes the larger amount of heat to be released from the higher pressure-side flow path 66.

When the vehicle speed V is lower than the reference value Vref at step S130, the HVECU 70 determines that the engine 22 is not in the flow path heat release state. In this case, the HVECU 70 resets a counter C that indicates a duration time of the flow path heat release state, to a value 0 (step S140), calculates a new value of the air amount integration parameter J1 by adding the intake air flow Qa of the engine 22 to the previous integration parameter (previous J1) and calculates a new value of the operating time integration parameter J2 by adding a time interval ΔT that indicates an execution interval in repeated execution of this routine to the previous integration parameter (previous J2) (step S200) and then terminates this routine.

When the vehicle speed V is equal to or higher than the reference value Vref at step S130, on the other hand, the HVECU 70 determines that the engine 22 is in the flow path heat release state. In this case, the HVECU 70 increments and updates the counter C by a value 1 (step S150) and sequentially compares the updated counter C with a reference value C1, with a reference value C2 that is larger than the reference value C1 and with a reference value C3 that is larger than the reference value C2 (steps S160 to S180). The reference values C1, C2 and C3 will be described later.

When the counter C is smaller than the reference value C1, the HVECU 70 calculates a new value of the air amount integration parameter J1 by adding the intake air flow Qa of the engine 22 to the previous integration parameter (previous J1) and calculates a new value of the operating time integration parameter J2 by adding the time interval ΔT described above to the previous integration parameter (previous J2) (step S200) and then terminates this routine.

When the counter C is equal to or larger than the reference value C1 but is smaller than the reference value C2, the HVECU 70 calculates a new value of the air amount integration parameter J1 by adding a product of the intake air flow Qa of the engine 22 and a factor k that is larger than the value 0 and that is smaller than the value 1 to the previous integration parameter (previous J1) and calculates a new value of the operating time integration parameter J2 by adding a product of the the time interval ΔT described above and the factor k to the previous integration parameter (previous J2) (step S210) and then terminates this routine.

When the counter C is equal to or larger than the reference value C2 but is smaller than the reference value C3, the HVECU 70 sets the previous integration parameters (previous J1) and (previous J2) to a new value of the air amount integration parameter J1 and to a new value of the operating time integration parameter J2, i.e., keeps the air amount integration parameter J1 and the operating time integration parameter J2 unchanged (step S220) and then terminates this routine.

When the counter C is equal to or larger than the reference value C3, the HVECU 79 sets rate values ΔJ1 and ΔJ2, based on the vehicle speed V and the outside air temperature Tout (step S230), calculates a new value of the air amount integration parameter J1 and a new value of the operating time integration parameter J2 by respectively subtracting the set rate values ΔJ1 and ΔJ2 from the previous integration parameters (previous J1) and (previous J2) (step S240) and then terminates this routine.

Figure 5:
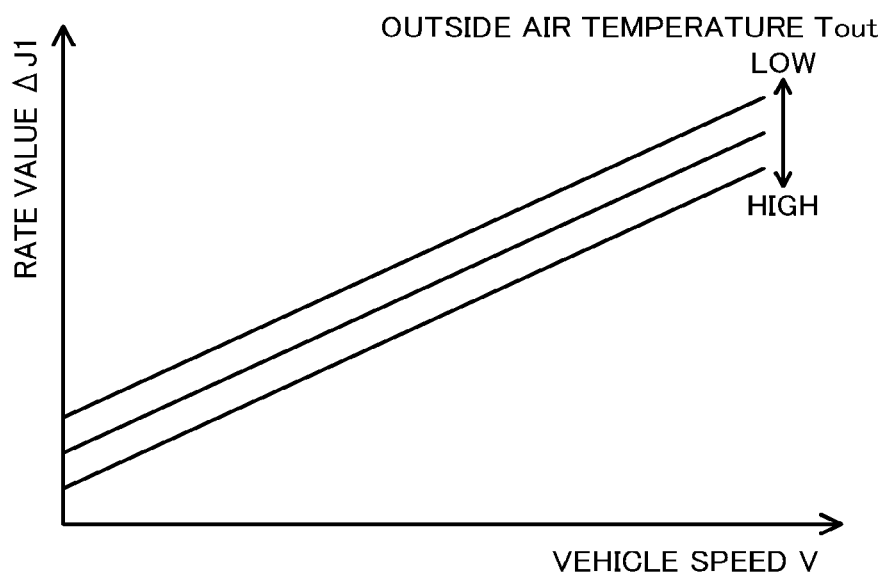
FIG. 5 is a diagram illustrating one example of the rate value setting map.

According to the embodiment, a procedure of setting the rate value ΔJ1 specifies in advance relationships of the vehicle speed V and the outside air temperature Tout to the rate value ΔJ1 and stores the specified relationships as a rate value setting map into the ROM (not shown). When values of the vehicle speed V and the outside air temperature Tout are given, the procedure reads out the rate value ΔJ1 corresponding to the given values of the vehicle speed V and the outside air temperature Tout from this map and sets the rate value ΔJ1. FIG. 5 is a diagram illustrating one example of the rate value setting map. As illustrated, the rate value ΔJ1 is set to increase with an increase in the vehicle speed V and to increase with a decrease in the outside air temperature Tout. Such settings are based on the facts that the higher vehicle speed V generates the stronger driving wind and causes the larger amount of heat to be released from the higher pressure-side flow path 66 and that the lower outside air temperature Tout causes the larger amount of heat to be released from the higher pressure-side flow path 66. Accordingly, the air amount integration parameter J1 is subject to the subtraction by the larger rate value ΔJ1 at the higher vehicle speed V and by the larger rate value ΔJ1 at the lower outside air temperature Tout, when the counter C is equal to or larger than the reference value C3. The rate value ΔJ2 is set to have similar tendencies relative to the vehicle speed V and the outside air temperature Tout to those of the rate value ΔJ1. Accordingly, the operating time integration parameter J2 is subject to the subtraction by the larger rate value ΔJ2 at the higher vehicle speed V and by the larger rate value ΔJ2 at the lower outside air temperature Tout, when the counter C is equal to or larger than the reference value C3.

Accordingly, the air amount integration parameter J1 and the operating time integration parameter J2 are subject to the addition, when the engine 22 is not in the flow path heat release state (when the vehicle speed V is lower than the reference value Vref) or when the engine 22 is in the flow path heat release state (when the vehicle speed V is equal to or higher than the reference value Vref) and the counter C is smaller than the reference value C2, during operation of the engine 22 for the time period from the ON operation to the OFF operation of the ignition switch 80. The air amount integration parameter J1 and the operating time integration parameter J2 are kept unchanged, when the engine 22 is in the flow path heat release state and the counter C is equal to or larger than the reference value C2 but is smaller than the reference value C3. The air amount integration parameter J1 and the operating time integration parameter J2 are subject to the subtraction, when the engine 22 is in the flow path heat release state and the counter C is equal to or larger than the reference value C3. In general, when the engine 22 falls into the flow path heat release state during operation of the engine 22, the temperature of the higher pressure-side flow path 66 is expected to continuously increase for a certain time period, to be subsequently kept substantially unchanged and to then decrease, due to, for example, the effect of radiant heat of the engine 22 prior to the flow path heat release state. The reference values C1, C2 and C3 are determined in advance by experiments or by analyses by taking into account this phenomenon. The reference value C1 used is, for example, a value equivalent to about 1 second to 10 seconds. The reference value C2 used is, for example, a value equivalent to about 100 seconds to 500 seconds. The reference value C3 used is, for example, a value equivalent to about 200 seconds to 600 seconds. As described above, the reference values C1, C2 and C3 are determined, and the air amount integration parameter J1 and the operating time integration parameter J2 are set according to the magnitude relation between the counter C and the reference values C1, C2 and C3 in the flow path heat release state. This enables the values of the air amount integration parameter J1 and the operating time integration parameter J2 to more appropriately reflect the temperature of the higher pressure-side flow path 66 (i.e., the degree of warming-up). The flow path heat release state continues, for example, in the case of a high speed cruise drive with low load operation of the engine 22.

The following describes a series of operations to perform characteristic abnormality diagnosis of the fuel pressure sensor 69 after elapse of a predetermined time period T2 (for example, 5 hours or 6 hours) since an OFF operation of the ignition switch 80. FIG. 6 is a flowchart showing one example of a characteristic abnormality diagnosis routine performed by the HVECU 70 after elapse of the predetermined time period T2 since an OFF operation of the ignition switch 80.

When the characteristic abnormality diagnosis routine of FIG. 6 is triggered, the HVECU 70 first obtains the inputs of data such as the cooling water temperature Tw of the engine 22 and the air amount integration parameter J1 and the operating time integration parameter J2 at the time of an OFF operation of the ignition switch 80 (step S300). The cooling water temperature Tw of the engine 22 input here is a value detected by the water temperature sensor 142 and received from the engine ECU 24 by communication. The air amount integration parameter J1 and the operating time integration parameter J2 input here are values calculated according to the parameter calculation routine of FIG. 3 at a stop of the engine 22.

After obtaining the input data, the HVECU 70 sequentially compares the input cooling water temperature Tw of the engine 22 with a reference value Twref (step S310), compares the input air amount integration parameter J1 with a reference value J1ref (step S320) and compares the input operating time integration parameter J2 with a reference value J2ref (step S330). The reference value Twref denotes a threshold value used to determine whether the current temperature of the higher pressure-side flow path 66 is sufficiently decreased to a level that enables characteristic abnormality diagnosis of the fuel pressure sensor 69 to be appropriately performed, and is determined in advance by experiments or by analyses. The reference values J1ref and J2ref denote threshold values used to determine whether the higher pressure-side flow path 66 has sufficiently been warmed up to a level that enables the characteristic abnormality diagnosis of the fuel pressure sensor 69 to be appropriately performed (i.e., to such a degree that causes the fuel pressure of the higher pressure-side flow path 66 to be decreased to the atmospheric pressure level, due to contraction of the fuel accompanied with a temperature decrease of the higher pressure-side flow path 66 until elapse of the predetermined time period T2 since an OFF operation of the ignition switch 80), at the time of an OFF operation of the ignition switch 80, and are determined in advance by experiments or by analyses. The processing of steps S310 to S330 is a process of determining whether preconditions for performing the characteristic abnormality diagnosis of the fuel pressure sensor 69 are satisfied.

When the cooling water temperature Tw of the engine 22 is equal to or higher than the reference value Twref at step S310, when the air amount integration parameter J1 is smaller than the reference value J1ref at step S320 or when the operating time integration parameter J2 is smaller than the reference value J2ref at step S330, the HVECU 70 determines that the preconditions for performing the characteristic abnormality diagnosis of the fuel pressure sensor 69 are not satisfied. In this case, the HVECU 70 terminates this routine without performing the characteristic abnormality diagnosis of the fuel pressure sensor 69.

When the cooling water temperature Tw of the engine 22 is lower than the reference value Twref at step S310, the air amount integration parameter J1 is equal to or larger than the reference value J1ref at step S320 and the operating time integration parameter J2 is equal to or larger than the reference value J2ref at step S330, on the other hand, the HVECU 70 determines that the preconditions for performing the characteristic abnormality diagnosis of the fuel pressure sensor 69 are satisfied. In this case, the HVECU 70 performs the characteristic abnormality diagnosis of the fuel pressure sensor 69 (steps S340 to S370) and then terminates this routine.

In the characteristic abnormality diagnosis of the fuel pressure sensor 69, the HVECU 70 first obtains the input of the fuel pressure Pfd detected by the fuel pressure sensor 69 and received from the engine ECU 24 by communication (step S340). The HVECU 70 subsequently determines whether the input fuel pressure Pfd is within a predetermined pressure range (a range from a reference value Pref1 to a reference value Pref2) (step S350). When the fuel pressure Pfd is within the predetermined pressure range, the HVECU 70 determines that the fuel pressure sensor 69 has no characteristic abnormality (i.e., the fuel pressure sensor 69 has normal characteristic) (step S360). When the fuel pressure Pfd is out of the predetermined pressure range, on the other hand, the HVECU 70 determines that the fuel pressure sensor 69 has a characteristic abnormality (step S370). The predetermined pressure range is determined in advance by experiments or by analyses.

FIG. 7 is a diagram illustrating one example of time changes in the state of the engine 22, the counter C, the air amount integration parameter J1, the operating time integration parameter J2 and the temperature of the higher pressure-side flow path 66. When the engine 22 falls into the flow path heat release state (at a time t1), increment of the counter C starts. When the counter C is smaller than the reference value C1, the air amount integration parameter J1 and the operating time integration parameter J2 increase accompanied with the increment of the counter C. When the counter C becomes equal to or larger than the reference value C1 (at a time t2), the air amount integration parameter J1 and the operating time integration parameter J2 increase with gentler slopes accompanied with the increment of the counter C, compared with the slopes when the counter C is smaller than the reference value C1. When the counter C becomes equal to or larger than the reference value C2 (at a time t3), the air amount integration parameter J1 and the operating time integration parameter J2 are kept unchanged irrespective of the increment of the counter C. When the counter C becomes equal to or larger than the reference value C3 (at a time t4), the air amount integration parameter J1 and the operating time integration parameter J2 decrease accompanied with the increment of the counter C. Such calculation of the air amount integration parameter J1 and the operating time integration parameter J2 enables the values of the air amount integration parameter J1 and the operating time integration parameter J2 to more appropriately reflect the temperature of the higher pressure-side flow path 66 (i.e., the degree of warming-up).

The hybrid vehicle 20 of the embodiment described above compares the air amount integration parameter J1 with the reference value J1ref and compares the operating time integration parameter J2 with the reference value J2ref, so as to determine whether the preconditions for performing the characteristic abnormality diagnosis of the fuel pressure sensor 69 are satisfied. The air amount integration parameter J1 and the operating time integration parameter J2 are subject to the addition, when the engine 22 is not in the flow path heat release state (when the vehicle speed V is lower than the reference value Vref) or when the engine 22 is in the flow path heat release state (when the vehicle speed V is equal to or higher than the reference value Vref) and the counter C is smaller than the reference value C2, during operation of the engine 22. The air amount integration parameter J1 and the operating time integration parameter J2 are kept unchanged, when the engine 22 is in the flow path heat release state and the counter C is equal to or larger than the reference value C2 but is smaller than the reference value C3. The air amount integration parameter J1 and the operating time integration parameter J2 are subject to the subtraction, when the engine 22 is in the flow path heat release state and the counter C is equal to or larger than the reference value C3. This enables the values of the air amount integration parameter J1 and the operating time integration parameter J2 to more appropriately reflect the temperature of the higher pressure-side flow path 66 (i.e., the degree of warming-up). As a result, this enables the characteristic abnormality diagnosis of the fuel pressure sensor 69 to be performed more appropriately.

The hybrid vehicle 20 according to the embodiment sets the reference value Vref that is used for comparison with the vehicle speed V (i.e., that is used to determine whether the engine 22 is in the flow path heat release state), based on the intake air flow Qa and the outside air temperature Tout. According to a modification, however, the reference value Vref may be set based on only the intake air flow Qa, without using the outside air temperature Tout.

The hybrid vehicle 20 according to the embodiment sets the reference value Vref based on the intake air flow Qa, resets the counter C to the value 0 when the vehicle speed V is lower than the reference value Vref, and increments and updates the counter C by the value 1 when the vehicle speed V is equal to or higher than the reference value Vref. According to a modification, however, the counter C may be reset to the value 0, when the intake air flow Qa is equal to or higher than a reference value Qaref or when the vehicle speed V is lower than a reference value Vref2. The counter C may be incremented and updated by the value 1, when the intake air flow Qa is lower than the reference value Qaref and the vehicle speed V is equal to or higher than the reference value Vref2. In this modification, the reference value Qaref used may be a fixed value or may be a value that increases with a decrease in the outside air temperature Tout. The reference value Vref2 used may be a fixed value or may be a value that decreases with a decrease in the outside air temperature Tout.

The hybrid vehicle 20 according to the embodiment causes the air amount integration parameter J1 and the operating time integration parameter J2 to be subject to the addition with the smaller additional values when the engine 22 is in the flow path heat release state and the counter C is equal to or larger than the reference value C1 but is smaller than the reference value C2, compared with the additional values used when the engine 22 is in the flow path heat release state and the counter C is smaller than the reference value C1. According to a modification, however, when the engine 22 is in the flow path heat release state and the counter C is smaller than the reference value C2, the air amount integration parameter J1 and the operating time integration parameter J2 may be subject to addition with respective fixed additional values, whether the counter C is equal to or higher than the reference value C1 or not. According to another modification, when the engine 22 is in the flow path heat release state and the counter C is smaller than the reference value C2, the air amount integration parameter J1 and the operating time integration parameter J2 may be subject to addition with additional values that respectively tend to decrease with an increment of the counter C.

The hybrid vehicle 20 of the embodiment causes the air amount integration parameter J1 and the operating time integration parameter J2 to be subject to addition when the engine 22 is in the flow path heat release state and the counter C is smaller than the reference value C2, while keeping the air amount integration parameter J1 and the operating time integration parameter J2 unchanged when the engine 22 is in the flow path heat release state and the counter C is equal to or larger than the reference value C2 but is smaller than the reference value C3. According to a modification, however, when the engine 22 is in the flow path heat release state and the counter C is smaller than the reference value C3, the air amount integration parameter J1 and the operating time integration parameter J2 may be subject to addition or may be kept unchanged, whether the counter C is equal to or larger than the reference value C2.

The hybrid vehicle 20 of the embodiment sets the rate values $\Delta J1$ and $\Delta J2$ used for subtraction of the air amount integration parameter J1 and the operating time integration parameter J2, based on the vehicle speed V and the outside air temperature Tout, when the engine 22 is in the flow path heat release state and the counter C is equal to or larger than the reference value C3. According to a modification, however, the rate values $\Delta J1$ and $\Delta J2$ may be set, based on either one of the vehicle speed V and the outside air temperature Tout. According to another modification, the rate values $\Delta J1$ and $\Delta J2$ may be respectively set to fixed values.

The hybrid vehicle 20 of the embodiment keeps the air amount integration parameter J1 and the operating time integration parameter J2 unchanged during stop of the engine 22. According to a modification, however, at a stop of the engine 22, subtraction of the air amount integration parameter J1 and the operating time integration parameter J2 may be started immediately. According to another modification, the air amount integration parameter J1 and the operating time integration parameter J2 may be kept unchanged until elapse of a predetermined time period since a stop of the engine 22 and may be subject to subtraction after elapse of the predetermined time period.

The hybrid vehicle 20 of the embodiment uses the air amount integration parameter J1 and the operating time integration parameter J2 as the warming-up determination parameters. A modification may, however, use only either one of the air amount integration parameter J1 and the operating time integration parameter J2 as the warming-up determination parameter.

The hybrid vehicle 20 of the embodiment is provided with the engine ECU 24, the motor ECU 40, the battery ECU 52 and the HVECU 70. According to a modification, at least two of these ECUs may be configured as a single electronic control unit.

The hybrid vehicle 20 of the embodiment is configured such that the engine 22 and the motor MG1 are connected via the planetary gear 30 with the driveshaft 36 coupled with the drive wheels 39a and 39b and that the motor MG2 is connected with the driveshaft 36. The present disclosure may also be applicable to a one-motor hybrid vehicle configured such that a motor is connected via a transmission with a driveshaft coupled with drive wheels and that an engine is connected with a rotating shaft of the motor via a clutch. The present disclosure may further be applicable to a series hybrid vehicle configured such that a motor for driving is connected with a driveshaft coupled with drive wheels and that a motor for power generation is connected with an engine and serves to transmit electric power to and from the motor for driving. The present disclosure may also be applicable to an automobile that is not provided with a motor but that is driven with only the power from an engine.

In the vehicle of the present disclosure, during operation of the engine for the time period from the system-on operation to the system-off operation, the control device may cause the warming-up determination parameter to be subject to addition when the duration time of the flow path heat release state is shorter than a second predetermined time period that is shorter than the first predetermined time period, while keeping the warming-up determination parameter unchanged when the duration time of the flow path heat release state is equal to or longer than the second predetermined time period but is shorter than the first predetermined time period. This configuration enables the value of the warming-up determination parameter to more appropriately reflect the temperature of the supply flow path, when the duration time of the flow path heat release state is shorter than the first predetermined time period.

In this case, the control device may use a first integration parameter with regard to integration of an intake air flow of the engine and/or a second integration parameter with regard to integration of an operating time of the engine, as the warming-up determination parameter, and during operation of the engine for the time period from the system-on operation to the system-off operation, the control device may cause the first integration parameter and/or the second integration parameter to be subject to addition when the engine is not in the flow path heat release state or when the duration time of the flow path heat release state is shorter than the second predetermined time, the control device may keep the first integration parameter and/or the second integration parameter unchanged when the duration time of the flow path heat release state is equal to or longer than the second predetermined time period but is shorter than the first predetermined time period, and the control device may cause the first integration parameter and/or the second integration parameter to be subject to subtraction when the duration time of the flow path heat release state is equal to or longer than the first predetermined time period.

In this case, during operation of the engine for the time period from the system-on operation to the system-off operation, the control device may cause the first integration parameter and/or the second integration parameter to be subject to addition with a smaller additional value when the duration time of the flow path heat release state is shorter than the second predetermined time period but is equal to or longer than a third predetermined time period that is shorter than the second predetermined time period, compared with an additional value used when the duration time of the flow path heat release state is shorter than the third predetermined time period.

In the vehicle of the present disclosure, the control device may determine that the engine is in the flow path heat release state when a vehicle speed is equal to or higher than a reference value that is set to increase with an increase in intake air flow of the engine. This configuration is based on the facts that the higher intake air flow of the engine causes the larger amount of heat to be generated by the engine and causes the larger amount of heat to be received by the supply flow path and that the higher vehicle speed generates the stronger driving wind and causes the larger amount of heat to be released from the supply flow path. This configuration accordingly enables the determination of whether the engine is in the flow path heat release state, to be performed based on the vehicle speed and the intake air flow of the engine. In this aspect, the reference value may be set to decrease with a decrease in the outside air temperature. This is based on the fact that the lower outside air temperature causes the larger amount of heat to be released from the supply flow path.

In the vehicle of the present disclosure, the control device may determine that the engine is in the flow path heat release state when an intake air flow of the engine is lower than a first reference value and a vehicle speed is equal to or higher than a second reference value. This configuration enables the determination of whether the engine is in the flow path heat release state, to be performed based on the vehicle speed and the intake air flow of the engine. In this aspect, the first reference value may be set to increase with a decrease in the outside air temperature. The second reference value may be set to decrease with a decrease in the outside air temperature.

The following describes the correspondence relationship between the primary components of the embodiment and the primary components of the disclosure described in Summary. The cylinder injection valve 126 of the embodiment corresponds to the "cylinder injection valve", the engine 22 corresponds to the "engine", the higher pressure-side flow path 66 corresponds to the "supply flow path", the high pressure fuel pump 65 corresponds to the "high pressure fuel pump", the fuel supply device 60 corresponds to the "fuel supply device", the fuel pressure sensor 69 corresponds to the "fuel pressure sensor", the HVECU 70 and the engine ECU 24 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the vehicle and so on.

What is claimed is:

1. A vehicle, comprising:
an engine having a cylinder injection valve configured to inject a fuel into a cylinder;
a fuel supply device having a high pressure fuel pump configured to pressurize the fuel from a fuel tank and supply the pressurized fuel to a supply flow path which is connected with the cylinder injection valve;
a fuel pressure sensor configured to detect a pressure of the fuel in the supply flow path; and
a control device configured to control the engine and the fuel supply device and to perform characteristic abnormality diagnosis that determines whether a characteristic abnormality occurs in the fuel pressure sensor, when an abnormality diagnosis precondition is satisfied after duration of a system-off state for a set time period that is set in advance since a system-off operation, wherein the abnormality diagnosis precondition includes a condition that a warming-up determination parameter indicating a degree of warming-up in the supply flow path in the system-off state is equal to or larger than a predetermined value, wherein
during operation of the engine for a time period from a system-on operation to a system-off operation, the control device causes the warming-up determination parameter to be subject to addition when the engine is not in a flow path heat release state where an amount of heat released in the supply flow path is expected to be larger than an amount of heat received in the supply flow path, while causing the warming-up determination parameter to be subject to subtraction when the engine is in the flow path heat release state and a duration time of the flow path heat release state is equal to or longer than a first predetermined time period.

2. The vehicle according to claim 1,
wherein during operation of the engine for the time period from the system-on operation to the system-off operation, the control device causes the warming-up determination parameter to be subject to addition when the duration time of the flow path heat release state is shorter than a second predetermined time period that is shorter than the first predetermined time period, while keeping the warming-up determination parameter unchanged when the duration time of the flow path heat release state is equal to or longer than the second predetermined time period but is shorter than the first predetermined time period.

3. The vehicle according to claim 2, wherein
the control device uses a first integration parameter with regard to integration of an intake air flow of the engine and/or a second integration parameter with regard to integration of an operating time of the engine, as the warming-up determination parameter, and
during operation of the engine for the time period from the system-on operation to the system-off operation,
the control device causes the first integration parameter and/or the second integration parameter to be subject to addition when the engine is not in the flow path heat release state or when the duration time of the flow path heat release state is shorter than the second predetermined time,
the control device keeps the first integration parameter and/or the second integration parameter unchanged when the duration time of the flow path heat release state is equal to or longer than the second predetermined time period but is shorter than the first predetermined time period, and
the control device causes the first integration parameter and/or the second integration parameter to be subject to subtraction when the duration time of the flow path heat release state is equal to or longer than the first predetermined time period.

4. The vehicle according to claim 3, wherein
during operation of the engine for the time period from the system-on operation to the system-off operation, the control device causes the first integration parameter and/or the second integration parameter to be subject to addition with a smaller additional value when the duration time of the flow path heat release state is shorter than the second predetermined time period but is equal to or longer than a third predetermined time period that is shorter than the second predetermined time period, compared with an additional value used when the duration time of the flow path heat release state is shorter than the third predetermined time period.

5. The vehicle according to claim 1, wherein
the control device determines that the engine is in the flow path heat release state when a vehicle speed is equal to or higher than a reference value that is set to increase with an increase in intake air flow of the engine.

6. The vehicle according to claim 1, wherein
the control device determines that the engine is in the flow path heat release state when an intake air flow of the engine is lower than a first reference value and a vehicle speed is equal to or higher than a second reference value.

7. The vehicle according to claim 1, wherein
when the counter is equal to or higher than the second reference counter and less than the third reference counter the warming-up determination parameter is unchanged.

8. The vehicle accord to claim 1, wherein
the control device determines that the engine is in the flow path heat release state when a vehicle speed is equal to or higher than a reference speed that is set to increase with an increase in intake air flow of the engine,
the control device increases a counter based when the vehicle speed is maintained equal to or higher than the reference speed,
when the counter is less than a first reference counter the warming-up determination parameter to be subject to addition, when the counter is equal to or higher than the first reference counter and less than a second reference counter the warming-up determination parameter to be subject to addition at rate less than when the counter is less than the first reference counter, when the counter is equal to or higher than a third reference counter the warming-up determination parameter to be subject to subtraction, and the first reference counter is less than the second reference counter and the second reference counter is less than the third reference counter.

\* \* \* \* \*